Figure 1:
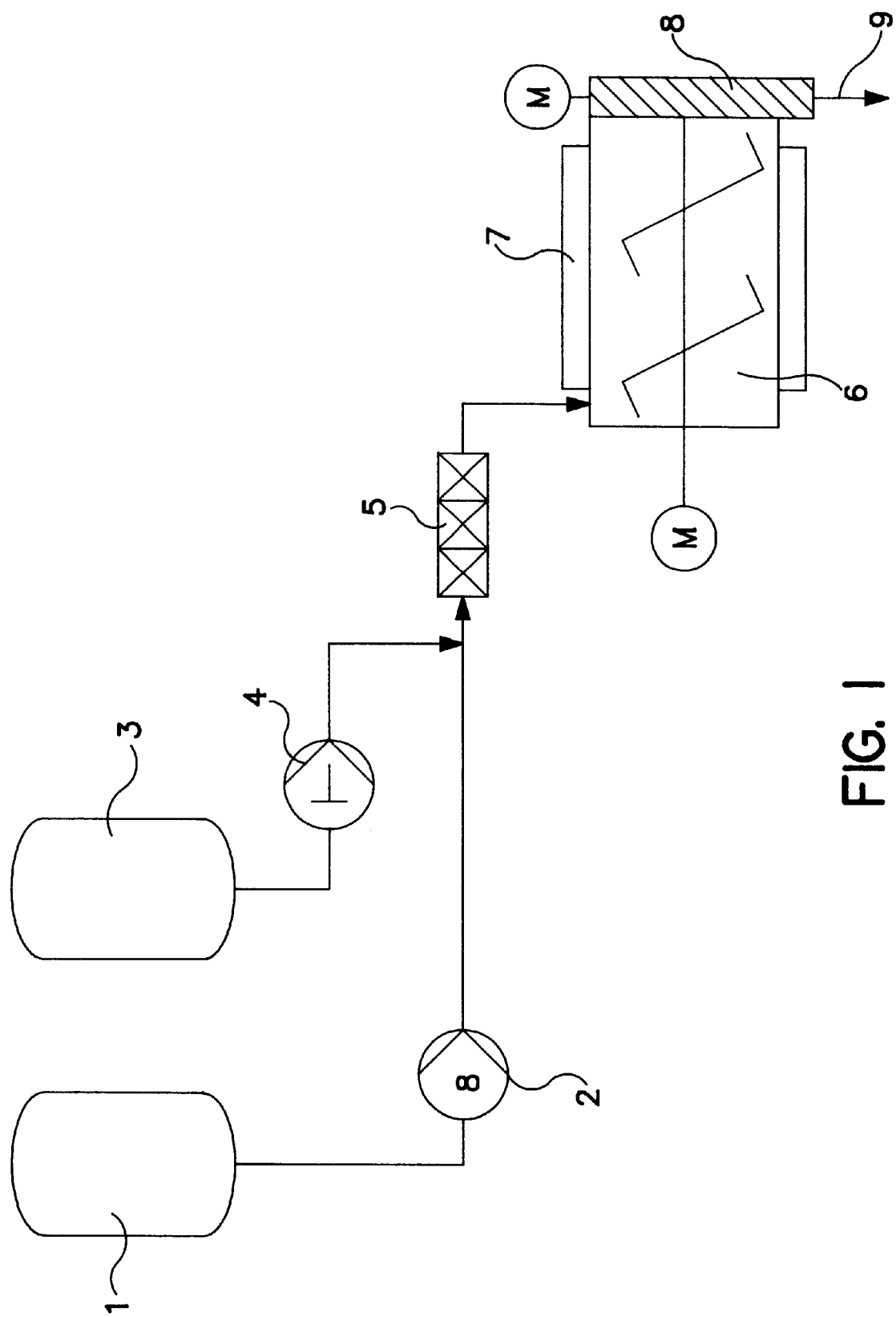

United States Patent [19]
Wünsch et al.

[11] Patent Number: 5,942,589
[45] Date of Patent: Aug. 24, 1999

[54] PREPARATION OF SEMICRYSTALLINE SYNDIOTACTIC POLYMERS OF VINYLAROMATIC MONOMERS

[75] Inventors: Josef Wünsch, Schifferstadt; Michael Schiessl, Hassloch; Ralph Diener, Wachenheim, all of Germany

[73] Assignee: BASF Aktiengesellschaft, Ludwigshafen, Germany

[21] Appl. No.: 08/905,236

[22] Filed: Aug. 1, 1997

[30] Foreign Application Priority Data

Aug. 2, 1996 [DE] Germany .............................. 196 313 65

[51] Int. Cl.[6] ...................................................... C08F 12/02
[52] U.S. Cl. ............................ 526/346; 526/160; 526/164; 526/170
[58] Field of Search ........................................ 526/160, 164, 526/170, 346

[56] References Cited

U.S. PATENT DOCUMENTS 5,747,613  5/1998  Takeuchi et al. .......................... 526/134

*Primary Examiner*—Edward J. Cain
*Attorney, Agent, or Firm*—Keil & Weinkauf

[57] ABSTRACT

Essentially syndiotactic and semicrystalline polymers which comprise vinylaromatic monomers are prepared from a reaction mixture containing, as components, vinylaromatic compounds, metallocene complexes as catalysts and one or more cocatalysts selected from the group consisting of the strong, neutral Lewis acids, the ionic compounds having Lewis acid cations and the ionic compounds having Brönsted acids as cations, by a process in which the components are premixed before entering the reactor.

19 Claims, 1 Drawing Sheet

PREPARATION OF SEMICRYSTALLINE SYNDIOTACTIC POLYMERS OF VINYLAROMATIC MONOMERS

The present invention relates to a process for the preparation of essentially syndiotactic and semicrystalline polymers which comprise vinylaromatic monomers from a reaction mixture containing, as components, vinylaromatic compounds, metallocene complexes as catalysts and one or more cocatalysts selected from the group consisting of the strong, neutral Lewis acids, the ionic compounds having Lewis acid cations and the ionic compounds having Brönsted acids as cations, wherein the components are premixed before entering a reactor.

The present invention furthermore relates to an apparatus suitable for such a process The present invention also relates to the use of the polymers obtainable by this process for moldings, films, fibers and coatings.

Owing to their property profile, polymers of vinylaromatic compounds, in particular polystyrene, are used in many areas, for example as packaging material or as coatings for metals or plastics, preferably in electrical applications, but also as thermoplastic molding materials for injection molding applications.

EP 379 128 discloses a process for the preparation of a styrene-based polymer having a highly syndiotactic configuration, which process attempts to increase the yield and syndiotacticity by connecting various specially designed reactors in series. However, in spite of very expensive reactor technology, only a syndiotacticity of not more than 97% in combination with a maximum yield of 80% is achieved by this process.

EP 584 646 discloses a process for the preparation of syndiotactic styrene-containing polymers by adding a catalyst or a catalyst and a starting monomer in at least two regions of a reactor, along the reactor axis. However, in spite of the multiple metering, this process achieves only a maximum syndiotacticity of 98.4% in combination with a conversion of less than 50%.

It is an object of the present invention to provide a process for the preparation of semicrystalline, essentially syndiotactic polymers of vinylaromatic compounds which lead to a polymer having high syndiotacticity in combination with high yield and are less expensive in terms of process technology.

We have found, surprisingly, that this object is achieved by the process as claimed in claim 1.

We have also found the use of the polymers obtainable thereby for the production of moldings, films and fibers.

As a result of the premixing, the novel apparatus leads to substantially better homogenization of the polymerization mixture before the polymerization. As a result of this, and owing to the uniformity of the polymerization mixture during the polymerization in the reactor, fewer thermal fluctuations occur and hence the control of the novel process is substantially simplified compared with the prior art processes. The premixing according to the invention furthermore has the advantage of requiring a shorter reaction zone which has to be heated.

A further advantage of the novel process is the gentle activation of the catalyst as a result of the premixing of catalyst and cocatalysts at room temperature in the upstream mixer. The gentle activation of the catalyst also has an advantageous effect on the homogeneity of the polymerization mixture. Because the catalyst is activated during the premixing, the reaction begins immediately in the reactor and proceeds substantially more uniformly compared with the case where the activation of the catalyst does not take place until the latter is inside the reactor. This activation also leads to easier control of the polymerization in the reactor. Furthermore, the activation of the catalyst during the premixing enables more monomer to be converted per quantity of catalyst and a narrower molecular weight distribution to be achieved in comparison with the prior art.

Moreover, the amount of stirring and kneading energy used during the reaction is smaller as a result of the premixing according to the invention. This is the case in particular if a static mixer is used since the mixing takes place therein while the polymerization mixture flows through. The novel process is particularly advantageous when the static mixer is arranged in such a way that the premixing of the polymerization mixture is effected by gravitational force.

A further advantage of the novel process is that, in particular owing to the gentle activation of the catalyst and the good homogenization of the polymerization mixture, subsequent metering of the catalyst is not required for carrying out the polymerization reaction with high yield in combination with high syndiotacticity.

Particularly suitable vinylaromatic compounds are compounds of the general formula I

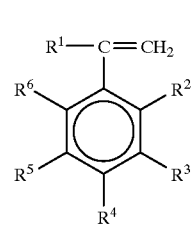

(I)

where

R$^1$ is hydrogen or C$_1$–C$_4$-alkyl, R$^2$ to R$^6$, independently of one another, are each hydrogen, C$_1$–C$_{12}$-alkyl, C$_6$–C$_{18}$-aryl or halogen or two adjacent radicals together form a cyclic group of 4 to 15 carbon atoms.

Preferably used vinylaromatic compounds of the formula I are those in which

R$^1$ is hydrogen and

R$^2$ to R$^6$ are each hydrogen, C$_1$–C$_4$-alkyl, chlorine or phenyl, or two adjacent radicals together form a cyclic group of 4 to 12 carbon atoms, resulting, for example, in naphthalene derivatives or anthrarcene derivatives as compounds of the general formula I.

Examples of such preferred compounds are: styrene, p-methylstyrene, p-chlorostyrene, 2,4-dimethylstyene, 4-vinylbiphenyl, 2-vinylnaphthalene or 9-vinylanthracene.

Mixtures of different vinylaromatic compounds may also be used, but only one vinylaromatic compound is preferably used.

Particularly preferred vinylaromatic compounds are styrene and p-methylstyrene.

The preparation of vinylaromatic compounds of the general formula I is known per se and is described, for example, in Beilstein 5, 367, 474, 485.

In the novel process, preferably used metallocene complexes are those of the general formula II

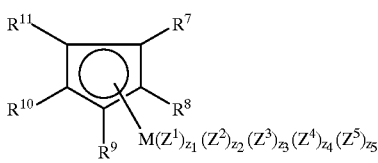

(II)

where

R$^7$ to R$^{11}$ are each hydrogen, C$_1$–C$_{10}$-alkyl, 5- to 7-membered cycloalkyl, which in turn may carry C$_1$–C$_6$-alkyl groups as substituents, or C$_6$–C$_{15}$-aryl or arylalkyl, or two adjacent radicals together may furthermore form a cyclic group of 4 to 15 carbon atoms, or Si(R$^{12}$)$_3$, R$^{12}$ is C$_1$–C$_{10}$-alkyl, C$_6$–C$_{15}$-aryl or C$_3$–C$_{10}$-cycloakyl, M is a metal of subgroup III to VI of the Periodic Table of Elements or a metal of the lanthanide series, Z$^1$ to Z$^5$ are each hydrogen, halogen, C$_1$–C$_{10}$-alkyl, C$_6$–C$_{15}$-aryl, C$_1$–C$_{10}$-alkoxy or C$_1$–C$_{15}$-aryloxy and z$_1$ to z$_5$ are each 0, 1, 2, 3, 4 or 5, the sum z$_1$+z$_2$+z$_3$+z$_4$+z$_5$ corresponding to the valency of M minus 1.

Particularly preferred metallocene complexes of the general formula II are those in which M is a metal of subgroup IV of the Periodic Table of Elements, in particular titanium, and Z$^1$ to Z$^5$ are each C$_1$–C$_{10}$-alkyl, C$_1$–C$_{10}$-alkoxy or halogen.

Examples of such preferred metallocene complexes are:
indenyltitanium chloride,
indenyltitanium trimethylate,
indenyltitaniumtrimethyl,
pentamethylcyclopentadienyltitanium trichloride,
pentamethylcyclopentadienyltitaniumtrimethyl and
pentamethylcyclopentadienyltitanium trimethylate.

Metallocene complexes as described in EP-A 584 646 may also be used.

Mixtures of different metallocene complexes may also be employed.

The synthesis of such complex compounds can be carried out by methods known per se, the reaction of the appropriately substituted, cyclic hydrocarbon anions with halides of titanium, zirconium, hafnium, vanadium, niobium or tantalum being preferred.

Examples of appropriate preparation processes are described, inter alia, in J. Organometal. Chem. 369 (1989), 359–370.

The cocatalyst used is a coordination complex compound selected from the group consisting of the strong, neutral Lewis acids, the ionic compounds having Lewis acid cations and the ionic compounds having Brönsted acids as cations.

Preferred strong, neutral Lewis acids are compounds of the general formula III

where

M$^1$ is an element of the main group III of the Periodic Table, in particular B, Al or Ga, preferably B, and X$^1$, X$^2$ and X$^3$ are each hydrogen, C$_1$–C$_{10}$-alkyl, C$_6$–C$_{15}$-aryl, alkylaryl, arylalkyl, haloalkyl or haloaryl, each having 1 to 10 carbon atoms in the alkyl radical and 6 to 20 carbon atoms in the aryl radical, or fluorine, chlorine, bromine or iodine, in particular haloayl, preferably pentafluorophenyl.

Particularly preferred compounds of the general formula III are those in which X$^1$, X$^2$ and X$^3$ are identical, preferably tris(pentafluorophenyl)borane. These compounds and processes for their preparation are known per se and are described, for example, in WO 93/3067.

Suitable ioric compounds having Lewis acid cations are compounds of the general formula IV

where

A is an element of main group I to VI or subgroup I to VIII of the Periodic Table, Q$_1$ to Q$_z$ are radicals having a single negative charge, such as C$_1$–C$_{28}$-alkyl, C$_6$–C$_{15}$-aryl, alklaryl, arylalkyl, haloalkyl, haloaryl, each having 6 to 20 carbon atoms in the aryl radical and 1 to 28 carbon atoms in the alkyl radical, C$_1$–C$_{10}$-cycloalkyl which may be substituted by C$_1$–C$_{10}$-alkyl, or halogen, C$_1$–C$_{28}$-alkoxy, C$_6$–C$_{15}$-aryloxy, silyl or mercaptyl, a is an integer from 1 to 6, z is an integer from 0 to 5 and d corresponds to the difference a–z, but d is greater than or equal to 1.

Carbonium cations, oxonium cations or sulfonium cations and cationic transition metal complexes are particularly suitable. Particular examples are the triphenylmethyl cation, the silver cation and the 1,1'-dimethylferrocenyl cation.

They preferably have noncoordinating opposite ions, in particular boron compounds, as also mentioned in WO 91/09882, preferably tetrakis(pentafluorophenyl)borate and particularly preferably the dimethylaluminum salts thereof.

Ionic compounds having Brönsted acids as cations and preferably likewise noncoordinafting opposite ions are mentioned in WO 93/3067, a preferred cation being N,N-dimethylanilinium.

The metallocene complexes may be employed on a carrier but are preferably used without a carrier.

Suitable carriers are, for example, silica gels, preferably those of the formula SiO$_2$.bAl$_2$O$_3$, where b is from 0 to 2, preferably from 0 to 0.5, ie. essentially aluminosilicates or silica. The carriers preferably have particle diameter of from 1 to 200 μm, in particular from 30 to 80 μm. Such products arc commercially available, for example as Silica Gel 332 from Grace.

Further carriers include finely divided polyolefins, for example finely divided polypropylene or polyethylene, as well as polyethylene glycol, polybutylene terephthalate, polyethylene terephthalate, polyvinyl alcohol, polystyrene, preferably syndiotactic polystyrene, polybutadiene, polycarbonates or copolymers thereof.

Alkylaluminums and the hydrides thereof may additionally be used in the polymerization. Among these, trimethylaluminum, triethylaluminum, triisopropylaluminum, tri-n-propylaluminum, triisobutylaluminum and tri-n-butylalumin are particularly suitable, but especially triisobutylaluminum.

Dialkylaluminum hydrides preferred according to the invention are dimethylal hydride, diethylaluminum hydride, diisopropylaluminum hydride, di-n-propylaluminum hydride, diisobutylaluminum hydride and di-n-butylaluminum hydride, diisobutylaluminum hydride and di-n-butylaluminum hydride being particularly preferred.

It has proven advantageous if the molar ratio of the vinylaromatic compound to the cocatlyst is from 10$^1$:1 to 10$^7$:1, preferably from 10$^2$:1 to 10$^6$:1, particularly preferably from 10$^3$:1 to 10$^5$:1. The molar ratio of cocatalyst to metallocene complex is preferably from $10^{-2}:1$ to $10^7:1$, in particular from $10^2:1$ to $10^5:1$.

The molar ratio of the vinylaromatic compound to the aliphatic $C_1$–$C_4$-hydrocarbons is preferably from 5:1 to $10^4:1$, in particular from 10:1 to $10^3:1$.

If an alkylaluminum is used, the molar ratio of alkylaluminum to metallocene complex of from 10,000:1 to 1:1, preferably from 1.000:1 to 1:1, particularly preferably from 1,000:1 to 10:1, has proven particularly suitable.

The molar ratio of catalyst to alkylalumoxane is from 1:10 to 1:10,000, preferably from 1:20 to 1:9,000. The molar ratio of alkylalumoxane to trialkylaluminum is from 1:0.001 to 1:10,000, preferably from 1:0.01 to 1:5,000. The molar ratio of catalyst to vinylaromatic monomer is from 1:1,000 to 1:10,000,000, preferably from 1:2,000 to 1:1,000,000.

Suitable polymerization temperatures are from 0 to 150° C., preferably from 10 to 100° C., particularly preferably from 40 to 80° C. The polymerization times may be from 0.1 to 24, preferably from 0.5 to 12, particularly preferably from 1 to 6, hours.

The novel process can be carried out in all nonpolar and aprotic polar solvents, preferably in the monomer or in monowmer mixtures as a solvent and particularly preferably in the absence of a solvent. In the novel process, it has proven advantageous to use the catalyst in a gasoline fraction, for example petroleum ether, hexane, pentane, benzene, toluene, ethylbenzene, xylene or styrene. The novel process can be carried out at reduced, atmospheric or superatmospheric pressure. It is preferable to carry out the novel process under atmospheric pressure, under the pressure which results from the liquid column of the polymerization mixture or is generated by the novel apparatus, or under reduced pressure. The reaction is particularly preferably carried out under the pressure which is generated by the gravitational force of the liquid column of the polymerization mixture or by the pumps metering in the reaction components.

Supported and unsupported catalysts can be initially taken in conventional organic solvents, such as cyclic or alicyclic hydrocarbons, for example in the various isomers of butane, penane, bexane and heptane and in cyclobute, cyclopentane, cyclohexane and cycloheptane or in aromatic solvents, for example pentene, toluene, ethylbenzene or xylene, or in oxygen-containing solvents, for example tetrahydrofuran, in halogenated solvents, for examplc dichloromethane, in nitrogen-containing solvents, for example N-methylpiperidine, etc., toluene and ethylbenzene being preferred and ethylbenzene particularly preferred. Mixtures of the above solvents may also be used in the novel process.

The reaction mixture comprising monomers, catalysts and cocatalyst is activated by the premixing according to the invention. The premixing is preferably carried out at a temperature at which the reaction mixture is still liquid and the polymerization does not start. Depending on the components used for the reaction mixture, this temperature is from −30 to +140° C., preferably from 0 to 70° C., particularly preferably from 15 to 30° C. Furthermore, in the novel activation, the premixing should preferably be carried out in such a way that the residence time and the temperature are chosen so that not only does the polymerization reaction not start but also there is no damage to the catalyst in spite of mixing sufficient for activation.

The activation by premixing of the reaction mixture is advantageously effected a short time or immediately before the polymerization reaction. The period between activation by premixing and polymerization is from 0 to 60, preferably from 0.01 to 45, particularly preferably from 0.1 to 30, minutes, the premixing preferably being effected essentially without a reaction starting.

The novel process is advantageously carried out in the absence of a solvent. In a particularly preferred embodiment of the novel process, the monomers used initially act as solvents. Moreover, it is advantageous to carry out the novel process in an inert gas atmosphere, for example comprising nitrogen or argon, as far as possible with the exclusion of moisture.

In the novel process, the premixing takes place preferably without a reaction occurring. Furthermore, it is advantageous according to the invention that the polymers are obtained so that they can be further processed, preferably extruded, essentially immediately after the polymerization. This is preferably the case when polymerization in the novel process is driven to high yields and accordingly the polymer has a low residual monomer content. This residual monomer content is less than 10, preferably less than 5, particularly preferably less than 3, % by weight, based on the weight of the polymer. The residual monomers remaining in the polymer can be removed, for example, by evaporation or by application of reduced pressure. The novel process is preferably carried out in a mixing/kneading reactor with a downstream extruder, without it being necessary to carry out further working up steps, for example distilling off relatively large amounts of residual monomers, which are obtained in particular at low conversion. Thus, the novel process permits further processing of the polymer essentially immediately after its preparation.

The novel process is carried out, for example, in an apparatus which essentially has the following composition: a reservoir 1 for the liquid mixture comprising monomer and cocatalyst is connected via a metering means 2, and a catalyst-containing reservoir 3 via a metering means 4, to a reactor 6, a mixing apparatus 5 being present in between.

In a preferred embodiment of the novel process, a discharge apparatus or an extruder is located essentially directly downstream of a mixing/kneading reactor. This arrangement is particularly advantageous because it takes account of the fact that polymers obtained in the novel process have only a low residual monomer content and permits immediate further processing or compounding of the polymer.

Reservoirs 1 preferred according to the invention are inert to the mixture of monomer and cocatalyst. Examples of suitable reservoirs are containers made of stainless steel, in particular V2A or V4A stainless steel. Preferred inert containers for the mixture of monomer and cocatalyst have a glass or ceramic surface. It is also possible to use, as reservoir 1, a plastics container which is inert to the mixture of monomer and cocatalyst.

Metering means 2 suitable according to the invention are, for example, pumps, in particular reciprocating pumps and gear pumps, a gear pump being particularly preferred in the case of continuous operation.

Suitable novel reservoirs 3 for the catalyst art containers which are inert to the catalyst. In principle, the containers used for reservoir 1 are also suitable for reservoir 3, containers having a glass or ceramic surface begin particularly preferred.

The catalyst, preferably the metallocene catalyst solutions, can be metered with the novel metering means 4, which is, for example, a pump, preferably a reciprocating or gear pump, particularly preferably a reciprocating pump in the case of continuous operation. The reservoir 1 and the metering means 2 on the one hand and the reservoir 3 and the metering means 4 on the other hand can be arranged directly one behind the other or, preferably, connected directly to a mixing apparatus 5.

Suitable pipeline systems must be inert to the polymerization mixture or the components thereof. Such pipeline systems consist, for example, of plastic or stainless steel, in particular V2A or V4A stainless steel, or have a glass or ceramic surface.

According to the invention, suitable mixing apparatuses are mixers, preferably static mixers. The novel mixing apparatus is preferably surrounded by a heating/cooling jacket in order to keep the mixing apparatus at a temperature suitable for activation by premixing.

A reactor 6 is downstream of the mixing apparatus 5. Preferably, the reactor 6 is directly downstream of the mixing apparatus 5. The reactor should be designed so that the residence time in the case of continuous operation is from 10 minutes to 5 hours. It is also advantageous to provide the reactor 6 with a heating/cooling jacket 7. All reactors which appear suitable to a person skilled in the art may be used, a mixing and kneading reactor being preferred and a two-put mixing ad kneading reactor being particularly preferred. Mixing and kneading units are two or more self-purging pairs of screws arranged in parallel. A discharge apparatus 8 is downstream of the reactor 6. Examples of the novel discharge apparatus 8 are conveyor belts or conveyor screws, preferably a twin-screw discharge apparatus, particularly preferably a twin-screw discharge apparatus having screws rotating in the same direction.

The novel process may also be carried out in an apparatus having three reservoirs, the monomer or the monomer mixture being present in one reservoir, the second reservoir containing the catalyst and the third reservoir containing the cocatalyst. The three reservoirs are likewise connected to the premixer by appropriate metering means. The components of the polymerization mixture which are contained in the three reservoirs may be combined either before or in the premixer. This also applies to the case where only two reservoirs are used.

In a preferred embodiment of the novel apparatus, a liquid mixture comprising monomer, preferably styrene, and methylalumoxane is metered from the reservoir 1, preferably continuously, through a gear pump 2 and is mixed continuously, at from 15 to 25° C. in a static mixer 5, with the metallocene catalyst solution, preferably a toluene solution of pentamethylcyclopentadienyltitanium trichloride, pentamethylcyclopentadienyltitanium trimethylate or, particularly preferably, pentamethylcyclopentadienyltitaniumtrimethyl, which is likewise metered continuously via a reciprocating pump 4.

The reaction components are activated by the premixing. The mixture is then metered continuously to the reactor 6. After a residence time of from 10 minutes to 3 hours, preferably from 15 to 60 minutes, particularly preferably from 20 to 45 minutes, in the continuously operating mixing and kneading reactor 6, the polymer 9 containing essentially styrene is discharged as solid particles (powder) by a screw 8.

The polymer obtained by the novel process with the use of the novel apparatus has a high melting point of at least 270° C. The thermal and structural features of the predominantly syndiotactic polystyrene lead to excellent mechanical properties at relatively high temperatures, even above the glass transition temperature. The syndiotactic polystyrene furthermore has high resistance to chemicals, rigidity and tensile strength and good dimensional stability and excellent dielectric properties.

The novel process and the novel apparatus lead to a simultaneous increase in the conversion, in the molecular weight and in the syndiotacticity and semicrystallinity of the polymer. Furthermore, they make it possible to mange with smaller amounts of catalyst since the risk of damage to the catalyst, especially due to the premixing and the thermal load on the catalyst, is reduced. The process also permits a simple design of the apparatus; for example, one-stage metering is sufficient for carrying out the novel process.

FIG. 1 is a schematic drawing of an example of the novel apparatus.

The Examples which follow illustrate the invention.

EXAMPLES

Example 1 (Comparative Example)

12.0 kg of styrene (115.2 mol) are mixed with 1.642 kg of methylalumoxane (2.881 mol) from Witco GmbH, Bergkamen, and 1.427 kg of triisobutylaluminum (1.440 mol) from Witco GmbH, Bergkamen, under it gas (nitrogen) and the mixture is metered by means of a gear pump from Feinprüf into a continuously operated mixing and kneading reactor type AP12 Conti ftom List, having a total reaction volume of 22.8 l. Parallel to the metering of the reaction mixture, 2.1912 g (0.0096 mol) of the catalyst (pentamethylcyclopentadienyl)trimethyltitanium [Cp*TiMe$_3$] dissolved in 1.2 liters of toluene are likewise metered to the first apparatus block by means of an M3 reciprocating pump from LEWA at a rate of 100 ml of catalyst solution per hour.

Polymerizadon parameters:

Conversion: 39%

Syndiotacticity: 98.2%

Mw: 121.000

Example 2

12.0 kg of styrene (1152 mol) are mixed with 821 g of methylalumoxane (1.44 mol), Eurecen, from Witco GmbH, Bergkamen, and 238 g of triisobutylaluminum (0.24 mol) from Witco GmbH. Bergkamen under inert gas (nitrogen). The liquid mixture comprising styrene and methylalumoxane is metered continuously, with a throughput of 7.5 l/h, by a gear pump from Feinprüf and is mixed continuously at 20° C. with 1.096 g (0.0048007 mol) of the metallocene catalyst (pentamethylcyclopentadicnyl)trimcthyltitanium [Cp*TiMe$_3$], dissolved in 1.2 liters of toluene and likewise metered continuously, at a rate of 0.5 l/h by means of M3 reciprocating pump from LEWA in a static mixer of type SMX from Sulzer.

After passing through the static mixer, the preactivated reaction mixture is metered into a continuously operated mixing and kneading reactor type AP12 Conti from List having a total reaction volume of 22.8 l. The mixing and kneading reactor has two parallel Intermeshing stirring screws which rotate in opposite directions at a speed of 24 rpm (cleaning screw) and 6 rpm (main screw). The outer jacket and the screws of the reactor are heated to 75° C.

The average residence time of the reaction mixture in the reactor is 52 minutes, and the powder reaction product, syndiotactic polystyrene, is discharged continuously from the reactor space via a twin-screw discharge apparatus of type ADS 54 having screws rotating in the same direction.

Polymerization parameters:

Conversion: 92%

Syndiotacticity: 99.1%

Mw: 130,600

Example 3

12.0 kg of styrene (115.2 mol) are mixed with 821 g of methylalumoxane (1.44 mol), Eurecen, from Witco GmbH, Bergkamen, and 119 g of triisobutylaluminum (0.12 mol) from Witco GmbH, Bergkamen, under inert gas (nitrogen). The liquid mixture comprising styrene and methylalumoxane is metered continuously, with a throughput of 7.5 l/h, by a gear pump from Feinprüf and is mixed continuously at 20° C. with 1.096 g (0.0048007 mol) of the metallocene catalyst (pentamethylcyclopentadienyl)trimethyltanium [Cp*TiMe₃], dissolved in 1.2 liters of toluene and likewise metered continuously, at a rate of 05 l/h by means of an M3 reciprocating pump from LEWA in a static mixer of type SMX from Sulzer.

After passing through the static mixer, the preativated reaction mixture is metesired into a continuously operated mixing and kneading reactor type AP12 Conti from List having a total reaction volume of 22.8 l. The mixing and kneading reactor has two parallel intermeshing stirring screws which rotate in opposite directions at a speed of 24 rpm (cleaning screw) and 6 rpm (main screw). The outer jacket and the screws of the ractor are heated to 75° C.

The average residence time of the reaction mixture in the reactor is 52 minutes, and the powder reaction product, syndiotactic polystyrene, is discharged continuously from the reactor space via a twin-screw discharge apparatus of type ADS 54 having screws rotating in the same direction.

Polymerization parameters:
Conversion: 71%
Syndiotacicity: 99.5%
MW: 189,900

Example 4

12.0 kg of styrene (115.2 mol) and 12 g of divinylbenzene (0.092 mol) (m/p mixture) are mixed with 1.642 kg of methylalumoxane (2.881 mol), from Witco GmbH, Bergkamen, and 1.427 kg of triisobutylaluminm (1.440 mol) from Witco GmbH, Bergkamen, under inert gas (nitrogen). The liquid mixture comprising styrene and methylalumoxane is metered continuously, with a throughput of 7.5 l/h, by a gear pump from Feinprüf and is mixed continuously at 20° C. with 1.096 g (0.0048007 mol) of the metallocene catalyst (pentamethylcyclopentadienyl)-trimethyltitanium [Cp*TiMe₃], dissolved in 1.2 liters of toluene and like-wise metered continuously, at a rate of 0.5 l/h by means of an M3 reciprocating pump from LEWA in a static mixer of type SMX from Sulzer.

After passing through the static mixer, the preactivated reaction mixture is metered into a continuously operated mixing and kneading reactor type AP12 Conti from List having a total reaction volume of 22.8 l. The mixing and kneading reactor has two parallel intermeshing stirring screws which rotate in opposite directions at a speed of 24 rpm (cleaning screw) and 6 rpm (main screw). The outer jacket and the screws of the reactor are heated to 75° C.

The average residence time of the reaction mixture in reactor is 52 minutes, ad the powder reaction product, syndiotactic polystyrene, is discharged continuously from the reactor space via a twin-screw discharge apparatus of type ADS 54 having screws rotating in the same direction.

Polymerization parameters:
Conversion: 88%
Syndiotacicity: 99.5%
Mw: 1,201,300

ANALYSIS

1. Crystallinity

The crystallization state of the sPS samples was investigated by X-ray analysis. After the polymerization, the samples were in the γ-modification and had a crystallinity of about 30–35%. After melting of the sPS samples and subsequent slow cooling (5° C./min), the samples exhibited the β-modification, the crystallinity being about 50–55%. The wide-angle X-ray patterns for characterizing the crystallization state were recorded in transmission in a Siemens diffractometer (type D 500 HS) equipped with a monochromator and a position-sensitive detector.

2. Molecular weight

The molecular weights were determined by high-temperature GPC in 1,2,4-trichlorobenzene at 140° C. An apparatus from Waters (Waters 150° C.) was used for this purpose. The column material used was crosslinked divinylbenzene: Shodex columns.

3. Tacticity

The syndiotactic arrangement of the aromatic ligands was determined by ¹H- and ¹³C-NMR spectrometry on a 500 MHz apparatus from Varian (Varian VXR 500).

We claim:

1. A process for producing an essentially syndiotactic and semicrystalline polymer, said process comprising:

a) premixing a vinylaromatic monomer together with a metallocene complex and one or more cocatalysts selected from the group consisting of a strong, neutral Lewis acid, an anionic compound having a Lewis acid cation and an ionic compound having a Bronsted acid cation; and then b) polymerizing the vinylaromatic monomer together with the metallocene complex and one or more cocatalysts mentioned in a) above.

2. A process as claimed in claim 1, wherein the premixing is carried out essentially without a reaction starting.

3. A process as claimed in claim 1, wherein the vinylaromatic compounds used are those of the formula (I)

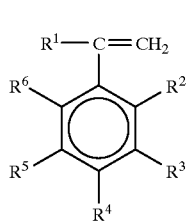

(I)

where

R¹ is hydrogen or C₁–C₄-alkyl and

R² to R⁶, independently of one another, are each hydrogen, C₁–C₁₂-alkyl, C₆–C₁₈-aryl or halogen or two adjacent radicals together form a cyclic group of 4 to 15 carbon atoms.

4. A process as claimed in claim 1, wherein the premixing of the components is carried out immediately before the polymerization reaction over a period of from 0.01 seconds to 2 hours in a temperature and pressure range in which the reaction mixture is present in liquid form and still does not react.

5. A process as claimed in claim 1, which is carried out in a mixing/kneading reactor with a downstream extruder.

6. A process as claimed in claim 1, wherein the polymers are extruded essentially immediately after the polymerization.

7. A process for the preparation of essentially syndiotactic and semicrystalline polymers which comprise vinylaromatic monomers from a reaction mixture containing, as components, vinylaromatic compounds, metallocene complexes as catalysts and one or more cocatalysts selected from the group consisting of the strong, neutral Lewis acids, the ionic compounds having Lewis acid cations and the ionic compounds having Brönsted acids as cations, wherein the components are premixed before entering a reactor, wherein the premixing is carried out essentially without a reaction starting.

8. A process as claimed in claim 7, wherein the vinylaromatic compounds used are those of the formula (I)

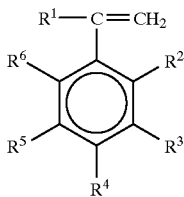

where $R^1$ is hydrogen or $C_1$–$C_4$-alkyl and $R^2$ to $R^6$, independently of one another, are each hydrogen, $C_1$–$C_{12}$-alkyl, $C_6$–$C_{18}$-aryl or halogen or two adjacent radicals together form a cyclic group of 4 to 15 carbon atoms.

9. A process as claimed in claim 7, wherein the premixing of the components is carried out immediately before the polymerization reaction over a period of from 0.01 seconds to 2 hours in a temperature and pressure range in which the reaction mixture is present in liquid form and still does not react.

10. A process as claimed in claim 7, which is carried out in a mixing/kneading reactor with a downstream extruder.

11. A process as claimed in claim 7, wherein the polymers are extruded essentially immediately after the polymerization.

12. A process for the preparation of essentially syndiotactic and semicrystalline polymers which comprise vinylaromatic monomers from a reaction mixture containing, as components, vinylaromatic compounds, metallocene complexes as catalysts and one or more cocatalysts selected from the group consisting of the strong, neutral Lewis acids, the ionic compounds having Lewis acid cations and the ionic compounds having Brönsted acids as cations, wherein the components are premixed before entering a reactor, wherein the premixing is carried out essentially without a reaction starting, wherein the vinylaromatic compounds used are those of the formula (I)

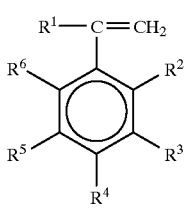

(I)

where $R^1$ is hydrogen or $C_1$–$C_4$-alkyl and $R^2$ to $R^6$, independently of one another, are each hydrogen, $C_1$–$C_{12}$-alkyl, $C_6$–$C_{18}$-aryl or halogen or two adjacent radicals together form a cyclic group of 4 to 15 carbon atoms.

13. A process as claimed in claim 12, wherein the premixing of the components is carried out immediately before the polymerization reaction over a period of from 0.01 seconds to 2 hours in a temperature and pressure range in which the reaction mixture is present in liquid form and still does not react.

14. A process as claimed in claim 12, which is carried out in a mixing/kneading reactor with a downstream extruder.

15. A process as claimed in claim 12, wherein the polymers are extruded essentially immediately after the polymerization.

16. A process for the preparation of essentially syidiotactic and semicrystalline polymers which comprise vinylaromatic monomers from a reaction mixture containing, as components, vinylaromatic compounds, metallocene complexes as catalysts and one or more cocatalysts selected from the group consisting of the strong, neutral Lewis acids, the ionic compounds having Lewis acid cations and the ionic compounds having Brönsted acids as cations, wherein the components are premixed before entering a reactor, wherein the premixing is carried out essentially without a reaction starting, wherein the vinylaromatic compounds used are those of the formula (I)

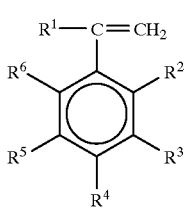

(I)

where $R^1$ is hydrogen or $C_1$–$C_4$-alkyl and $R^2$ to $R^6$, independently of one another, are each hydrogen, $C_1$–$C_{12}$-alkyl, $C_6$–$C_{18}$-aryl or halogen or two adjacent radicals together form a cyclic group of 4 to 15 carbon atoms, wherein the premixing of the components is carried out immediately before the polymerization reaction over a period of from 0.01 seconds to 2 hours in a temperature and pressure range in which the reaction mixture is present in liquid form and still does not react.

17. A process as claimed in claim 16, which is carried out in a mixing/kneading reactor with a downstream extruder.

18. A process as claimed in claim 16, wherein the polymers are extruded essentially immediately after the polymerization.

19. A method of using a polymer prepared as claimed in claim 1 for films, fibers, coatings and moldings.

* * * * *

UNITED STATES PATENT AND TRADEMARK OFFICE
CERTIFICATE OF CORRECTION

PATENT NO.: 5,942,589

DATED: August 24, 1999

INVENTOR(S): WUENSCH et al.

It is certified that error appears in the above-identified patent and that said Letters Patent is hereby corrected as shown below:

In the abstract, line 2, "arc" should be --are--.

Col. 12, claim 16, line 21 bridging line 22, "syidiotactic" should be --syndiotactic--.

Signed and Sealed this

Tenth Day of October, 2000

Attest:

Q. TODD DICKINSON

*Attesting Officer*      *Director of Patents and Trademarks*